United States Patent [19]

Ikeda et al.

[11] Patent Number: 4,830,929
[45] Date of Patent: May 16, 1989

[54] MOLDED WOODEN PRODUCTS

[75] Inventors: Sadao Ikeda, Toyota; Yoshio Taguchi, Nagoya, both of Japan

[73] Assignee: Toyota Jidosha Kabushiki Kaisha, Aichi, Japan

[21] Appl. No.: 938,619

[22] Filed: Dec. 5, 1986

[30] Foreign Application Priority Data

Dec. 9, 1985 [JP] Japan ................... 60-276606

[51] Int. Cl.⁴ .............................................. B60J 5/04
[52] U.S. Cl. .................... 428/542.8; 428/326; 428/537.1
[58] Field of Search ................ 428/326, 537.1, 542.8

[56] References Cited

U.S. PATENT DOCUMENTS

| | | | |
|---|---|---|---|
| 2,527,628 | 10/1950 | Francis, Jr. ................ | 428/326 X |
| 2,770,556 | 11/1956 | Grangaard et al. .......... | 428/63 X |
| 3,007,812 | 11/1961 | Smith et al. ............... | 428/454 X |
| 3,166,617 | 1/1965 | Munk ....................... | 428/542.8 X |
| 3,166,617 | 1/1965 | Munk et al. ................ | 264/109 |
| 3,238,281 | 3/1966 | Kato ........................ | 428/326 X |
| 3,261,897 | 7/1966 | Munk ....................... | 264/109 |
| 3,423,267 | 1/1969 | Munk ....................... | 264/120 X |
| 3,632,276 | 1/1972 | Munk ....................... | 425/419 X |
| 3,709,646 | 1/1973 | Munk ....................... | 264/109 X |
| 3,720,738 | 3/1973 | Munk ....................... | 264/109 X |
| 3,846,219 | 11/1974 | Kunz ....................... | 428/326 X |
| 4,078,030 | 3/1978 | Munk et al. ................ | 264/120 X |
| 4,175,105 | 11/1979 | Luck et al. ................. | 428/326 X |
| 4,236,365 | 12/1980 | Wheeler ................... | 428/326 X |
| 4,247,511 | 1/1981 | Sutton et al. .............. | 428/326 X |
| 4,265,067 | 5/1981 | Palmer ..................... | 52/309.9 |
| 4,268,565 | 5/1981 | Luck et al. ................. | 428/161 |
| 4,308,307 | 12/1981 | Heath et al. ............... | 428/167 |
| 4,612,224 | 9/1986 | Davis ....................... | 428/283 X |
| 4,643,860 | 2/1987 | Knudson et al. ........... | 428/326 X |
| 4,781,956 | 11/1988 | Zimmermann et al. .... | 428/43 |
| 4,790,966 | 12/1988 | Sandberg et al. .......... | 428/326 X |

FOREIGN PATENT DOCUMENTS

| | | | |
|---|---|---|---|
| 53-43779 | 4/1978 | Japan ....................... | 428/537.1 |
| 54-124081 | 9/1979 | Japan ....................... | 428/537.1 |
| 56-9480 | 1/1981 | Japan ....................... | 428/537.1 |

Primary Examiner—Henry F. Epstein
Attorney, Agent, or Firm—Finnegan, Henderson, Farabow, Garrett & Dunner

[57] ABSTRACT

A molded wooden product comprised of wood fibers to which a binder containing a synthetic resin or the like has been added, characterized in that it has portions of varying thickness, preferably a deep-drawn portion and a thickened peripheral portion, the molded wooden product being of substantially uniform density throughout.

13 Claims, 9 Drawing Sheets

MOLDED WOODEN PRODUCTS

BACKGROUND OF THE INVENTION

1. Field of the Invention

The present invention relates to molded wooden products, and more precisely, to wooden products formed by molding wood fibers under compression.

2. Description of the Related Art

In general, molded wooden products are manufactured by molding wood fibers, obtained by chopping or shaving wood, under compression and utilizing the binding properties of the wood fibers to form the products. These molded wooden products are so-called hard boards and are substantially uniform in composition, light in weight, and possess few defects. They have been widely utilized, for example, as interior materials for constructing furniture, interior substrates for cars, and materials for television and stereo cabinets. The surface of the products is smooth and has good heat- and moisture-resistance properties. Moreover, the products are relatively strong in relation to their overall thickness.

Molded wooden products are typically manufactured by a wet shaping method in which wood chips are treated to form wood fibers. A synthetic resin and cellulose paper are incorporated into the wood fibers and the mixture is dispersed in water. The mixture is then filtrated under pressure and pressed under vacuum (for so-called mat-making). The mat (soft fiber plate) thus obtained is then shaped under hot compression.

A mat B obtained by the above described method is shown in FIG. 16. The mat B is shaped by a shaping mold 11 comprising an upper mold 13 and a lower mold 12 as shown in FIG. 17. The upper and lower molds are heated by hot plates 14, as shown in FIG. 17. In the drawings, M represents a molded wooden product, and M' represents excess materials which remain after the mat has been shaped.

Conventional molded wooden products are manufactured by the above-mentioned hot-press shaping method in which a mat comprised of wood fibers is pressed and shaped under heat. In order to increase the strength and rigidity of the molded wooden products, a plurality of mats are pressed together and the thickness of the final product is thereby increased. Accordingly, an excessive amount of raw materials are required, and the resultant product is unnecessarily heavy.

The prior art attempted to eliminate these drawbacks by selectively stacking mats at only those parts of the mold corresponding to the portion of the molded wooden product which requires increased strength and rigidity. For example, mats may be stacked around the periphery of the mold so that only the peripheral portions of the molded product are thicker. However, it is difficult to make the part of the mold for shaping the thicker portion of the product completely identical to the shape of the piled mats in the cavity of the mold, and therefore, the portion between the thickened part and immediately adjacent parts in the molded product does not have the same density as the thickened portion. This variation in density causes the strength of the adjacent portion to be less than that of the thickened portion.

SUMMARY OF THE INVENTION

It is therefore an object of the present invention to provide method wooden products which are lightweight, have uniform density in the thickened portions with respect to the remainder of the molded wooden product, exhibit high strength and rigidity, and which are economical to manufacture.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

To achieve the foregoing objects, a molded wooden product is provided comprising wood fibers, to which a binder containing a synthetic resin has been added. The molded wooden product has portions therein of varying thickness and a substantially uniform density in the thickened portions and the remainder of the molded wooden product.

To manufacture molded wooden products having the characteristics of the present invention, wood fibers, to which a binder has been added, are directly placed into a shaping mold without first being formed into a mat. Requisite amounts of wood fibers to product the thickened portion of the molded product are directly placed in selected locations of the mold, and the fibers are then compression molded to produce the desired shape.

The wood fibers used in the present invention are obtained by first chipping bulk wood into smaller pieces. The wood used to make the fibers may be selected from, for example, akamatsu (Japanese red pine), a sugi (Japanese cedar), a lauan (Japanese beech), rice straws, flax husks, and bagasse. Other types of wood, or combinations of any of the aforementioned types of wood may also be used.

The wood fibers used to form the molded wood products may be formed by placing the small pieces of chipped wood under pressure and shredding them while in this pressurized state. Alternatively, the wood may be mechanically shredded under atmospheric pressure. The method of forming the wood fibers need not be limited to the above methods. Any conventional means which are known to those skilled in the art may be used.

The binder added to the wood fibers is selected to complement the natural bindability of the wood fibers to themselves. The amount of binder used is selected to provide the molded product with the desired strength characteristics. The binder is preferably a synthetic resin, which may include a thermoplastic resin such as a chroman resin or a thermosetting resin such as a phenol resin or an urea. It is especially preferable that the binder include a water-soluble resin such as a phenol resin. These resins may be used singly or as a mixture of one or more of the above. The specific binder used is not limited to the above-identified resins. Any resin which serves to bind the fibers together may be used. In addition to the binder, other additives such as a water-repelling agent and a surface lubricant may also be added to the wood fibers.

For manufacturing the molded wooden products of the present invention, a method is disclosed where wood fibers to which a binder has been added are directly placed in a shaping mold. The specific amount of the wood fibers placed in the mold is determined in accordance with the desired thickness of each portion of the molded wooden product, and the corresponding shape of the cavities of the mold wherein the thicker portions are formed.

The means of placing the wood fibers into the shaping mold includes a method in which the shaping mold is divided into an upper mold part and a lower mold part. The mold is then opened by separating the upper and lower parts whereupon cavities are formed between the upper part and the lower part corresponding to the thickened portions of the product. The wood fibers are introduced into the cavities of the mold under pressure by means of a compressed air flow so that the density of the wood fibers in the mold is uniform. Other methods of placing the wood fibers in the mold include stacking the fibers so that the areas corresponding to the thickened portions of the molded product have a greater depth of fibers. The stacked fibers are then directly conveyed into the shaping mold. Alternatively, the wood fibers may be stacked to a greater depth at selected areas and then pressed to create a uniform density of fibers in those portions of the pressed mat corresponding to the thickened portions of the molded product.

The temperature and pressure under which the hot compression molding occurs is selected according to the source of the wood fibers, the resins used in the binder, the shape of the article to be formed, and the desired strength of the article. By way of example and not limitation, a temperature of between 150° C. and 220° C., a shaping pressure of 20 to 80 kg/cm$^2$, and a shaping time of 20 seconds to 5 minutes have been used to form molded wooden products according to the present invention.

The molded wooden products of the present invention comprise wood fibers to which a binder containing a synthetic resin has been added. These products have uniform density and therefore exhibit improved strength characteristics compared to prior art molded wooden products. Additionally, the present invention requires a reduced amount of raw materials while exhibiting improved strength characteristics relative to prior art molded wooden products since selected portions of the molded wooden product are made thicker than adjacent portions while maintaining a uniform density throughout the entire product. Thus, the cost of manufacturing the molded wooden product and the overall weight thereof are reduced.

The accompanying drawings, which are incorporated in and constitute a part of the specification, illustrate a presently preferred embodiment of the invention and, together with the general description given above and the detailed description of the preferred embodiment given below, serve to explain the principles of the invention.

DESCRIPTION OF THE PREFERRED EMBODIMENT

The present invention is explained by reference to the following examples and the relevant drawings, in which a molded wooden product of the present invention is formed, such as an automobile door trim substrate having an arm rest.

EXAMPLE 1

This example illustrates one embodiment of a molded wooden product of the invention having a thickened peripheral portion. The molded wooden product is formed by holding wood fibers, to which a binder has been added, in a holder by means of vacuum holes disposed in the holder. The depth of the fiber mass is varied in accordance with the desired thickness of selected portions of the molded wooden product. The fiber mass is directly transported into a shaping mold without being formed into a mat. The fiber mass is then compressed in the mold to form a molded wooden product having the desired shape.

The wood fibers are formed from wood chips which are shredded and immersed in steam having a temperature between 160° C. and 180° C. The wetted wood fibers thus obtained are then dried with hot air.

The dried wood fibers are then placed in a blender where they are stirred while being sprayed with a water-repelling agent of, for example, paraffin (1 to 2% by dry weight) and a binder of, for example, an aqueous solution containing phenol resin (2 to 10% by dry weight, 50% resin content). The water content in the wood fibers is appropriately monitored and regulated in order to obtain the desired raw material mass.

The prior art would next form the raw material into a soft mat having a standarized form which would then be shaped in a mold. In the present invention, however, this raw material mass is directly placed in a mold without being formed into a mat.

Figure 1:
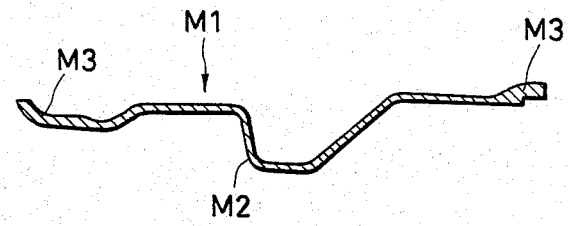
FIG. 1 shows a sectional view of one embodiment of a molded wooden product of the present invention manufactured as described in Example 1.
Figure 2:
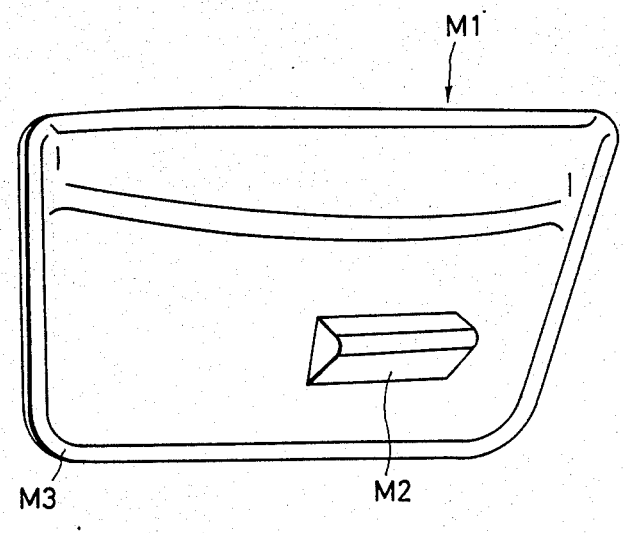
FIG. 2 shows an oblique view of the molded wooden product illustrated in FIG. 1.
Figure 3:
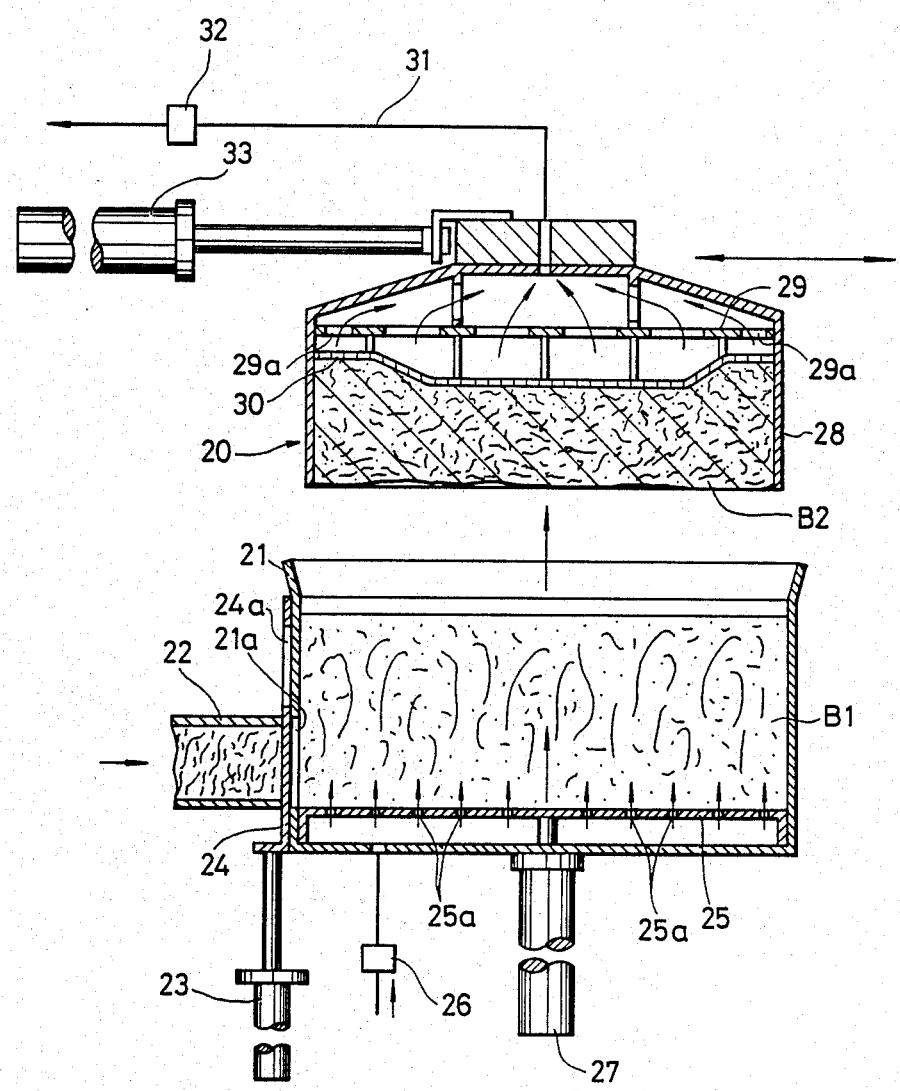
FIG. 3 shows a cross-sectional view of an apparatus for the generation of a raw material mass used to construct the molded wooden products of the present invention is described in Example 1.

The step of forming the raw material mass will now be explained. The raw material mass, B1 in FIG. 3, is fed into a container 21 through the pressure duct 22. The masking plate 24 disposed between the container 21 and the duct 22 is vertically movable. The container opening 21a is aligned with the masking plate opening 24a while a predetermined amount of the raw material B1 is fed into the container 21. The raw material mass B1 fed into the container 21 is uniformly stirred by an air stream introduced into the container 21 from a plurality of air holes 25a disposed in the bottom plate 25. A switch valve 26 is provided to regulate the amount of the air fed into the container.

The bottom plate 25 of the container 21 is drawn up toward the top of the holder 28 by vacuum plate 30, while simultaneously being driven upward by the cylinder 27. The vacuum plate 30 is comprised of a metal net, a punched metal plate, or the like, which is suspended from the ceiling 29. Vacuum holes 29a are provided in the top plate 29. Raw material mass B1 is pressed against vacuum plate 30 by a vacuum force created by evacuating air through the holes 29a and the vacuum ducts 31. A switch valve 32 controls the flow of air through the ducts. Vacuum plate 30 has a shaped surface having deep-drawn part about its periphery. Raw material mass B2, formed against vacuum plate 30, will therefore have thickened portions about its periphery corresponding to the desired thickened portions of the molded wooden product.

Figure 4:
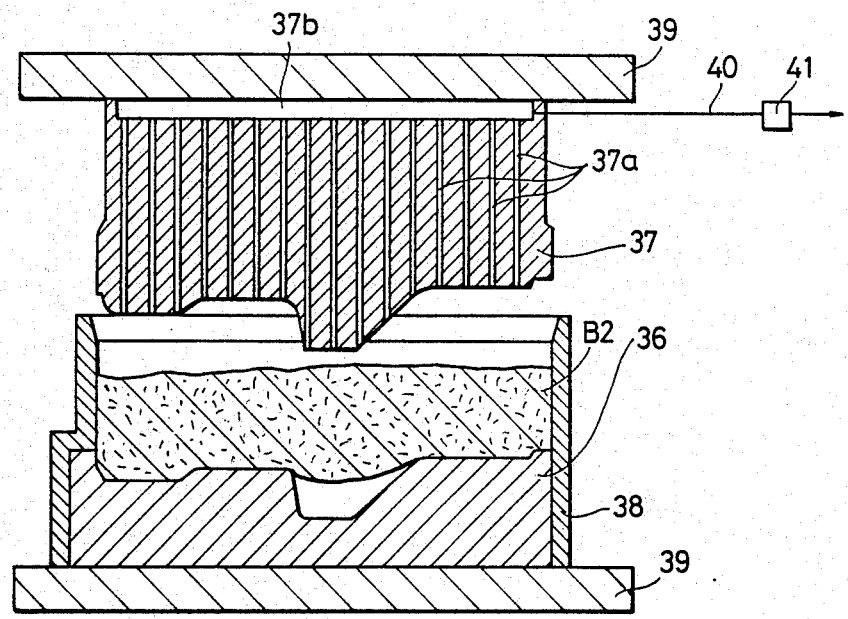
FIG. 4 shows a cross-sectional view of a shaping mold into which the raw material mass described in Example 1 has been placed.
Figure 5:
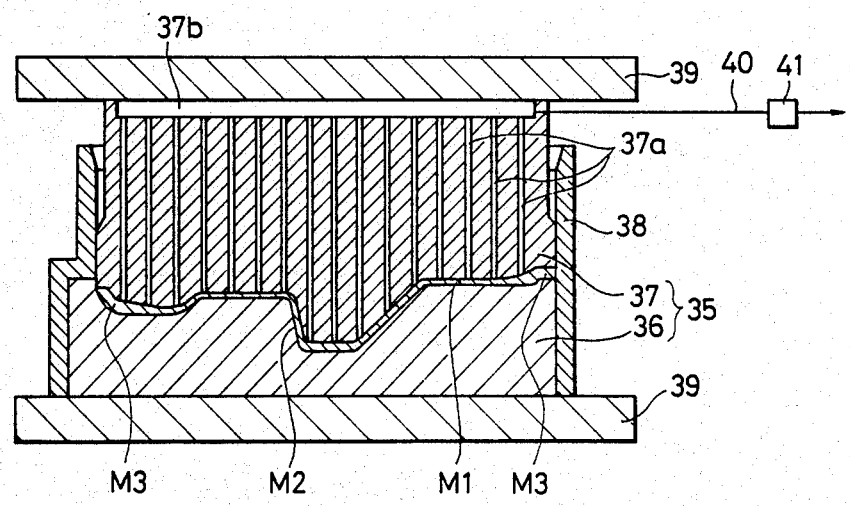
FIG. 5 shows a cross-sectional view of the shaping mold of FIG. 4 wherein the raw material mass is compressed.

Material mass B2 is hot-compression molded in shaping mold 35 (FIGS. 4 and 5). Holder 28, holding the material mass B2 as shown in FIG. 3, is transported and positioned above the lower mold 36 by movement of a driving cylinder 33 shown in FIG. 3. Next, valve 32 is deactivated to terminate the vacuum force holding the material mass B2 against the vacuum plate 30, thus depositing material mass B2 on the lower mold 36.

Referring to FIGS. 4 and 5, the shaping mold 35 has side walls 38, and lower and upper molds 36 and 37, respectively. Upper and lower molds 36 and 37 are heated by hot plates 39. Upper mold 37 has vent holes 37a formed therein for venting off gases contained in material mass B2 as the mass is compressed between upper and lower molds 36 and 37. The vented gas is evacuated through vacuum space 37b and vacuum duct 40. The upper and lower molds 36 and 37 are configured such that the height therebetween is greater about the periphery. Additionally, the upper and lower molds are formed with a deep-drawn part M2, comprising a recessed part in the lower mold 36 and a corresponding protruding part in the upper mold. As the upper and lower molds are moved toward each other to compress the material mass, the shape of the upper and lower molds defines thickened peripheral portions M3 and a deep drawn portion M2 in the formed molded wooden product M1. The molded wooden product thus formed has a substantially uniform density throughout and improved strength characteristics.

Referring to FIG. 5, a valve 41 is positioned on the vacuum duct 40 for opening and shutting the duct during the venting operation. Venting is initiated when the upper mold 37 is approximately 10 mm from the bottom dead point (corresponding to full compression of the mold). To release the molded wooden product from mold 35, the upper mold 37 is withdrawn to the top dead point (corresponding to the fully opened position of the mold) while maintaining the vacuum force through holes 37a, thus lifting the molded wooden product M1 from the lower mold 36. A conveyor means or the like (not shown) is inserted between the upper and lower molds, valve 41 is deactivated, and the product M1 drops from the upper mold 37 onto the conveyor means.

EXAMPLE 2

This example illustrates another embodiment of a molded wooden product of the invention having a thickened peripheral portion and a deep-drawn portion. Wood fibers, to which a binder or the like has been added, are directly fed into an opened shaping mold by a compressed air flow, and the wood fibers are then hot compression-molded to obtain the desired molded wooden product.

The wood fibers are obtained in the same manner as described in Example 1. A binder, a water-repelling agent, and a surface lubricant as described in Example 1, are blended with the wood fibers to obtain the raw material to be shaped.

Figure 6:
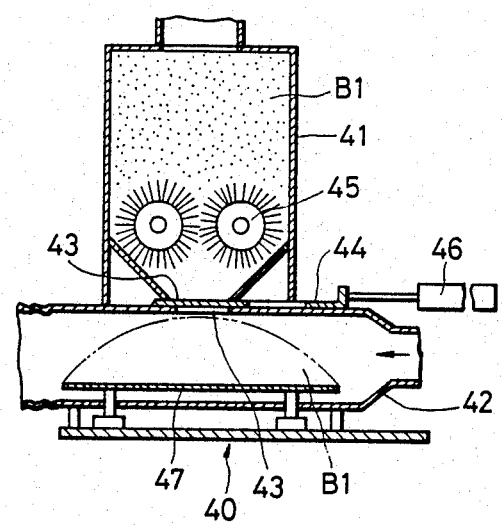
FIG. 6 shows a cross-sectional view of an apparatus for placing wood fibers into a mold as described in Example 2.

The raw material is then directly fed into a shaping mold without being formed into a mat, as explained hereunder. Referring to FIG. 6, the above-mentioned raw material B1 is placed in a feeding container 41 of a filler device 40. The filler device 40 comprises the feeding container 41 and the pressure container 42. The two containers are linked with each other via openings 43 located at the bottom part of the feeding container 41 and the upper part of the pressure container 42. The opening 43 is masked by a masking plate 44 which can be opened and shut by the action of the cylinder 46. The raw material B1 is dropped down to the pressure container 42 through the opening 43, while a pair of brush wheels 45, provided in the lower part of the feeding container 41 are rotated to separate the fibers of the raw material B1. The pressure container 42 is provided with a weighing plate 47 directly below the opening 43, and the deposited material B1 is piled on the weighing plate 47. A load cell (not shown) provided on the weighing plate 47 monitors the weight of the deposited raw material, and when the weight has reached a predetermined value, the brush wheels are stopped and the masking plate 44 is shut, thus discontinuing feeding of the raw material B1 onto plate 47.

Figure 7:
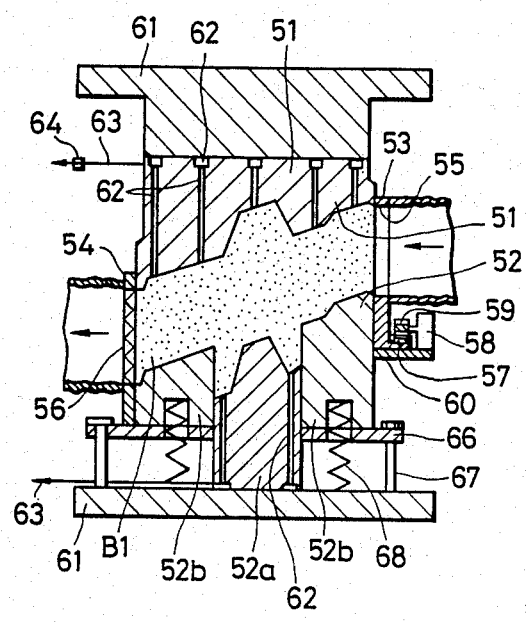
FIG. 7 shows a cross-sectional view of a shaping mold described in Example 2, into which the wood fibers have been placed by the apparatus shown in FIG. 6.

Referring now to FIG. 7, the shaping mold 50 comprises an upper mold 51 and a lower mold 52. The mold 50 is inclined to reduce the angle of compression on the part to be deep-drawn. The lower mold 52 comprises a plurality of parts including the fixed lower mold part 52a, positioned in the center of the mold and corresponding to the portion of the molded wooden product to be deep-drawn, and movable lower mold parts 52b which are supported by springs 68 and are adjacent to the fixed lower mold part 52a. When upper mold 51 and lower mold 52 are apart and the mold 50 is thus opened, the movable mold parts 52b are elevated by the springs 68 to a position higher than the fixed lower mold part 52a. Stopper plates 66 and stoppers 67 are positioned below the lower mold parts 52b to stop the movement of parts 52b.

Figure 10:
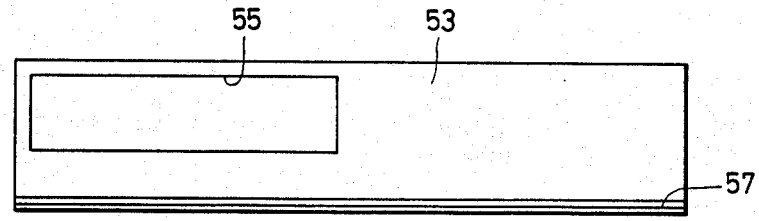
FIG. 10 shows the side plate and feeding part of the mold shown in FIGS. 7-9.

The upper mold 51 has a concave part corresponding to the lower part 52a. When opened, the shaping mold 50 forms a cavity where the deep-drawn part is broader than the other parts. The periphery of the mold 50 is surrounded by side plates 53 and 54 to contain the raw material B1. Side plates 53 and 54 face each other and are movable along the side surface of the mold 50. One side plate 53 has a feeding port 55 corresponding to the opening in the side of the opened mold 50 (FIG. 10). The other side plate 54 has a net 56 which holds the raw material B1 between the upper and lower molds and prevents the raw material from flowing out of the mold due to the angle of the mold parts.

One end of the pressure container 42 is aligned with the feeding port 55 of the side plate 53 of the mold 50. Air is introduced into the pressure container 42 in the direction of the arrow from the end opposite to the one aligned with feeding port 55. Thus, the raw material B1 in the pressure container 40 together with the air are introduced into the shaping mold 50 while the fibers of the material are pulverized and disintegrated. The air passes through the net 56 of the side plate 54, while the material B1 is stopped by the net 56, thus filling the cavity of the shaping mold 50. The raw material B1 is introduced into the mold 50 under pressure, and is stacked against the net 56 without the fibers becoming entangled.

The raw material B1 is degassed via the gas evacuation holes 62 provided in the upper mold 51 and the lower mold 52. The gas is then vented off through duct 63. In the degrassing procedure, the operation of gas evacuation holes 62 is staged from the lower side of the mold 50 to the upper side in accordance with the placing of the raw material B1 into the mold 50. The amount of the raw material B1 introduced into the mold 50 is larger in the deep-drawn part thereof than the other parts since the deep-drawn part has a larger volume.

Figure 8:
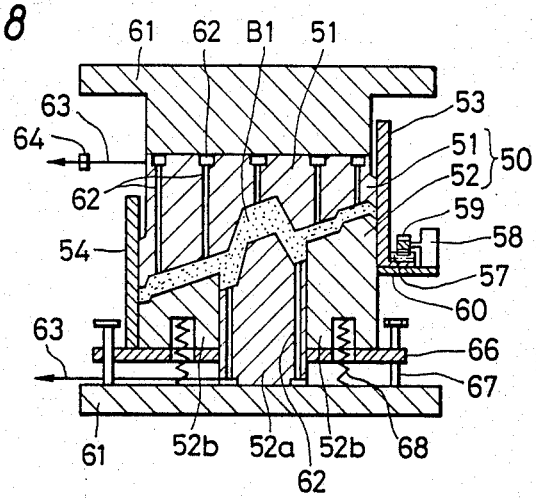
FIG. 8 shows a cross-sectional view of the shaping mold of FIG. 7 wherein the wood fibers are partially compressed.

Next, the material B1 is shaped under compression, as will now be explained. With reference to FIG. 8, the side plate 53 is slid up along the side surface of the mold 50 by the rack 57 and the pinion gear 59. Rack 57 is positioned below the side plate 53, while the pinion 59 is rotated by a motor 58 fixed to the bracket 60. In the same manner, the side plate 54 is also slid up along the side surface of mold 50 by a side plate-sliding means (not shown), so that the mold 50 is masked with the part of the side plate 54 adjacent the net 56. The positions of side plates 53 and 54 are fixed relative to the lower mold 52 by the bracket 60 and the bottom plate 66, respectively.

Figure 9:
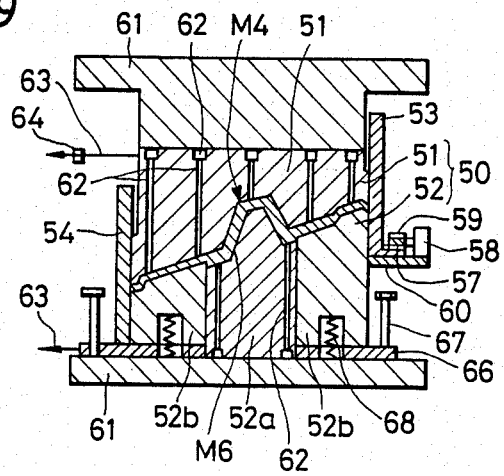
FIG. 9 shows a cross-sectional view of the shaping mold of FIG. 7 wherein the filled wood fibers are fully compressed.

Next, the raw material B1 is pressed and shaped under compression between the upper mold 51 and the lower mold 52. By way of example and not limitation, the upper and lower molds are heated to between 150° C. and 220° C. by hot plates 61. The molding surfaces of the movable lower mold parts 52b around the deep-drawn part M2, are elevated due to the force of the springs 68. The raw material B1 is thus sandwiched between the descending upper mold 51 and the lower mold parts 52b. The lower mold parts 52b are supported by the springs 68 and, thus, the pressure of the springs 68 is imparted to the raw material B1. As the upper mold 51 closes on the lower mold parts 52b, the height of the springs 68 and the parts 52b is reduced. The descent of the lower mold parts 52b is terminated when the stopper plates 66 reach the hot plate 61, as shown in FIG. 9. With the springs 68 only partially compressed, any excess wood fibers existing around the deep-drawn part of the mold flow into the deep-drawn part since the material in the deep-drawn part does not sense the force of springs 68 and is thus at a lower pressure than adjacent material.

The upper mold 51 is then lowered completely so that the raw material B1 is shaped under compression to form the desired molded wooden product. Any gas generated during compression is removed under vacuum from the gas-evacuation holes 62 via the vacuum duct 63 and the valve 64. This gas evacuation is set to begin when the top plate is approximately 10 mm from bottom dead point.

By way of example and not limitation, a shaping pressure of 20 to 80 kg/cm$^2$ and a shaping time of 20 seconds to 5 minutes was used.

The portion around the periphery of the deep-drawn part M4 is first compressed by the force in springs 68 and then the raw material is fully shaped under compression. In this manner, a deep-drawn portion can be made in the molded wooden product without the formation of any thin portions about the periphery and the resulting weakening of the molded product. In addition, the density of the molded wooden product is uniform throughout since the deep-drawn portion is completely filled with raw material during the first stage of compression due to the pressure differential created in the raw material by the force of the springs 68 causing the material to flow from the higher to the lower pressure region, thus fillng the deep-drawn portion. A molded wooden product with improved strength characteristics is thus obtained.

As the upper and lower mold parts move apart after complete compression, the vacuum force applied through holes 62 causes the molded wooden product to adhere to the upper part 51. When the vacuum force is released by deactivating the switch valve 64, the molded wooden product is released from the upper part 51.

Since the shaping of the molded wooden product is carried out with the mold being inclined in the present example, the compression angle and the drawing angle in the deep-drawn part are reduced compared to a non-inclined mold, and therefore, the shaping of the molded wooden product is achieved with a reduced likelihood that the deep-drawn portion will break away from the remainder of the molded wooden product during compression. Moreover, the inclination of the mold makes it easier to remove the molded wooden product therefrom.

EXAMPLE 3

This example illustrates still another embodiment of a molded wooden product according to the invention having a thickened peripheral portion and a deep-drawn portion. The molded wooden product is manufactured by selectively stacking wood fibers, to which a binder or the like has been added, to an increased depth at the portions of the molded wooden product which correspond to the thickened portions. The stacked wood fibers are then compressed to a uniform thickness, creating higher density regions at the thicker stacked portions. When the wood fibers are then placed in the shaping mold, the portions which correspond to the deep-drawn parts of the mold have a high initial density, which after compression will have a density uniform with the remainder of the molded wooden product.

The wood fibers are obtained in the same manner as previously described in Example 1. A binder and a water-repelling agent similar to those listed in Example 1 are blended with the wood fibers to obtain a raw material.

Figure 11:
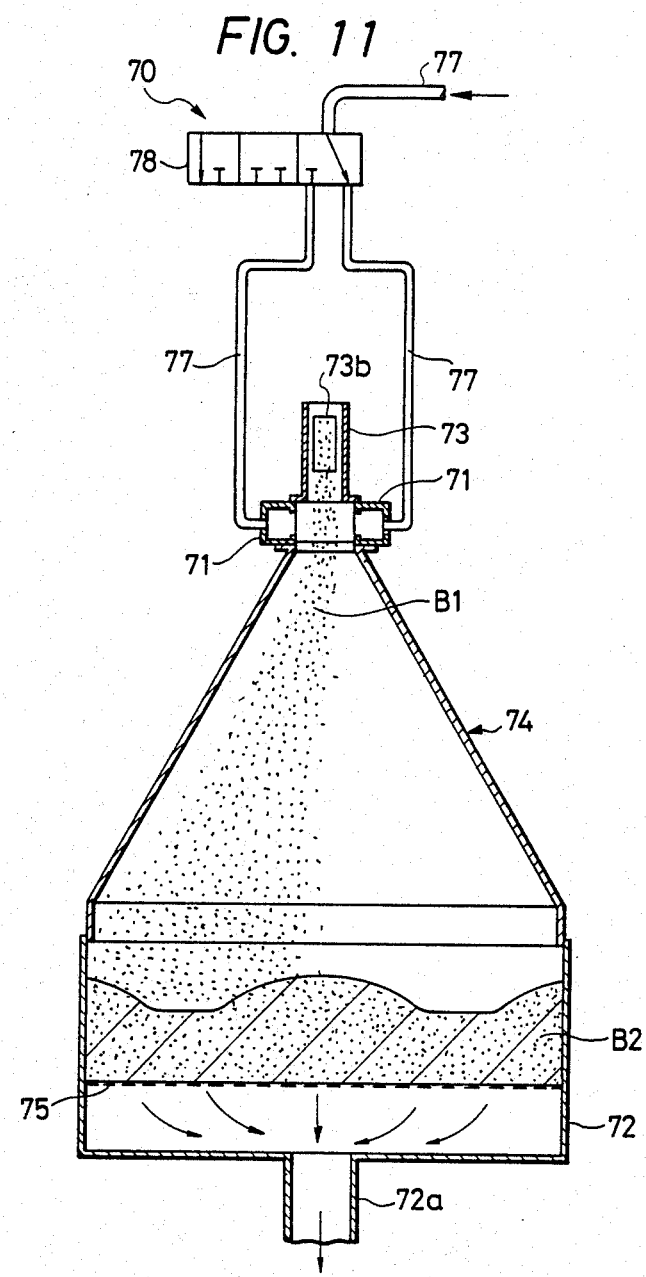
FIG. 11 is a cross-sectional view of an apparatus for generating a mass of the raw material described in Example 3.

The material is then formed into a mass in a manner which will now be described. As shown in FIG. 11, a mass-forming apparatus 70 is provided and principally comprises a spraying container 74, and a laminating container 72 for laminating the raw material B1 which is subsequently accumulated below the spraying container 74. A spray nozzle 73 is provided above the spraying container 74 for spraying the raw material B1 through a pressure duct 73b. Pressure duct 73b is provided with an air-jetting orifice 71 in the inside thereof. The air-jetting orifice 71 functions to regulate the spraying direction of the raw material B1. A joint part is provided between the spraying container 74 and the laminating container 72 so as to prevent the raw material B1 from leaking out around the walls of the container while the raw material B1 is being added. A vacuum duct 72a for applying a vacuum force on the raw material in the laminating container 72 is connected with the bottom side of the laminating container 72. A form-imparting part 75, which may comprise a metal net, a punched metal plate or the like, is provided which functions to form the bottom surface of the raw material mass in the laminating container into a predetermined shape. An air-feeding duct 77, for feeding air into the air-jetting orifice 71, is provided and a switch valve 78 for activating the duct is also provided.

Using the mass-forming apparatus 70, a raw material mass is formed as will now be explained. The switch valve 78 is opened to feed air into the air-jetting orifice 71 through the air-feeding duct 77, thus creating an air-flow to the laminating container 72. The material B1, fed into the spray nozzle 73 through the pressure duct 73b, is ejected from the bottom of spray nozzle 73 and moves downwards toward the laminating container 72. The raw material B1 is laminated in a predetermined form on the form-imparting part 75 in the laminating container 72, while the air fed from the air-jetting orifice 71 is appropriately regulated by activating the switching valve 78 or by closing the orifices 71. The laminated contents in the container 72 are pulled by the vacuum duct 72a to the form-imparting part 75. By appropriately activating the air-switching valve 78, the material is laminated to a height in proportion to the thickness of the product to be formed. In this step, the air-switching valve 78 is activated in response to a height-sensor (not shown) and the raw material B1 is accordingly sprayed so that the height of the peripheral part and the deep-drawn portion of the molded wooden product is made higher than that of the other parts. In this manner the material mass B2 is formed.

Figure 12:
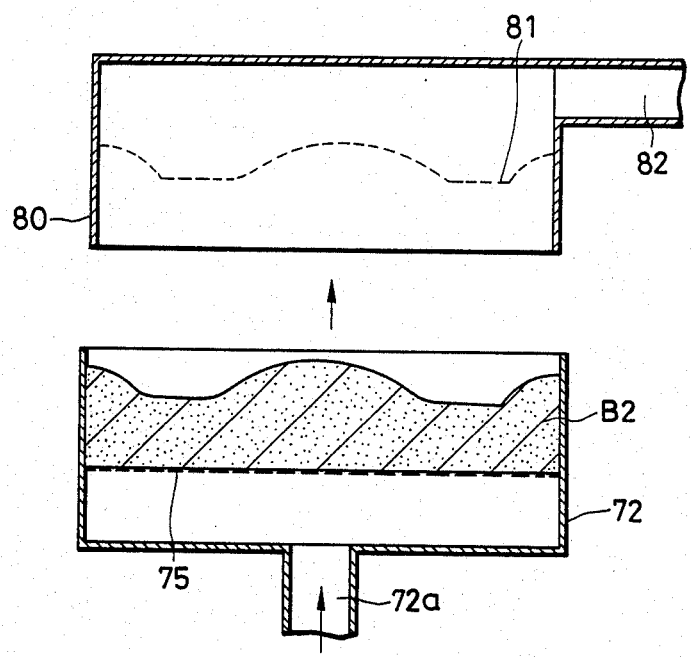
FIG. 12 is a cross-sectional view of the container and the holder described in Example 3 wherein the raw material is laminated.

Next, the material mass B2 is transported to a mold for hot-compression molding. The hot compression molding is explained here with reference to FIGS. 12 and 13. Laminating container 72 is released from the spraying container 74, and container 72 is positioned below a transporting holder 80. A plate-like form-regulator part 81, which is made of a metal net or the like, and which functions to regulate the shape of the upper side of the material mass B2 and substantially conforms to the shape of the laminating container 72, is provided in the upper side of the holder 80. The holder 80 is connected to the vacuum duct 82 which applies a vacuum force to the material mass in the holder 80 from above the form-regulator part 81. The laminating container 72 is lifted up with a lift (not shown), and the upper surface of the material mass B2 is lightly pressed. While the mass B2 is maintained in this state, the air in the holder 80 is drawn through the vacuum duct 82 by a vacuum pump (not shown), and the material mass B2 closely adheres to the upper form-regulator part 81. While the mass B2 is kept under the vacuum force, the holder 80 is moved by a moving means (not shown) and transported to a hot-compression shaping mold 85, shown in FIG. 14. Thereafter, the vacuum force is terminated and the mass B2 is placed in the mold 85.

Figure 13:
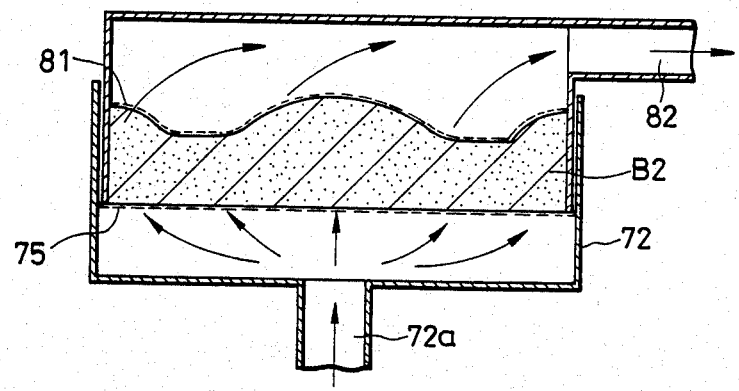
FIG. 13 is a cross-sectional view of the holder and container of FIG. 12 wherein the raw material is shaped.
Figure 14:
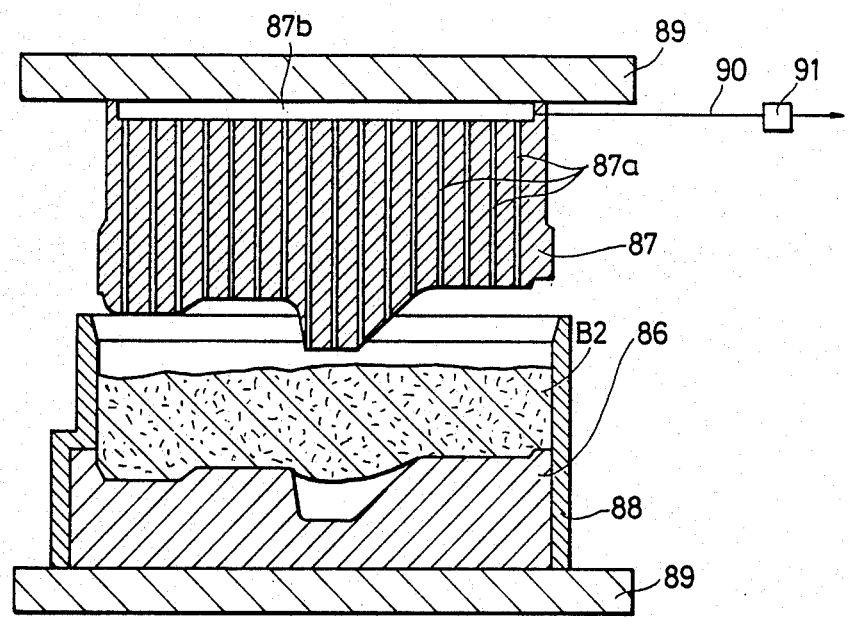
FIG. 14 is a cross-sectional view of a shaping mold described in Example 3.
Figure 15:
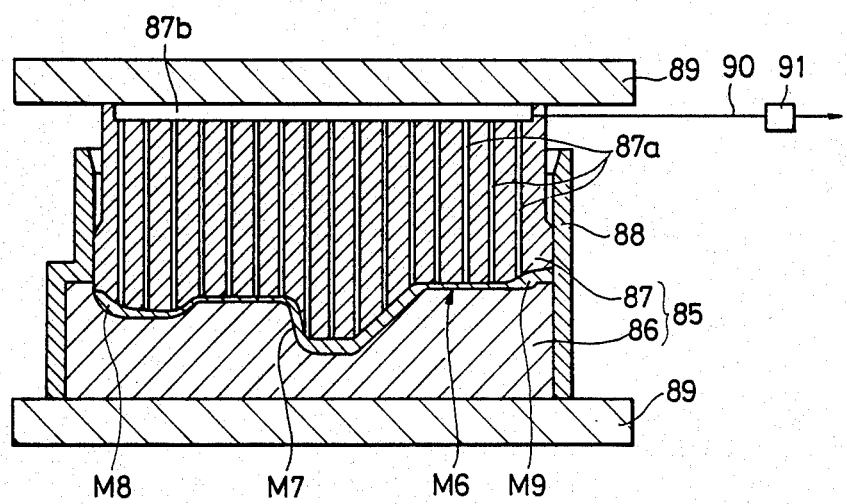
FIG. 15 is a cross-sectional view of the shaping mold of FIG. 14 wherein the raw material is compressed.
Figure 16:
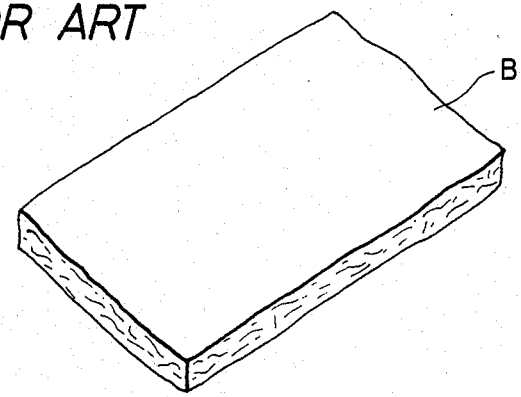
FIG. 16 is an oblique view of a prior art wood fiber mat.
Figure 17:
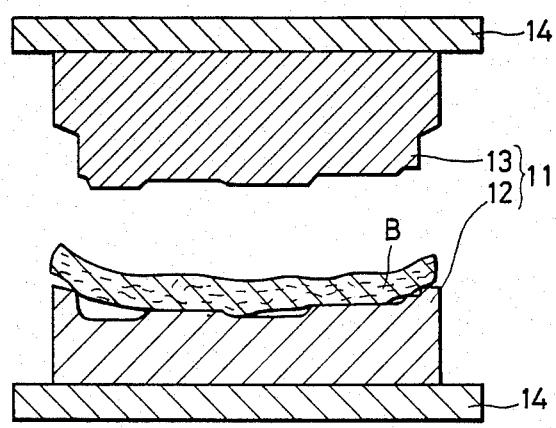
FIG. 17 is a cross-sectional view of a prior art shaping mold into which the mat illustrated in FIG. 16 has been placed.
Figure 18:
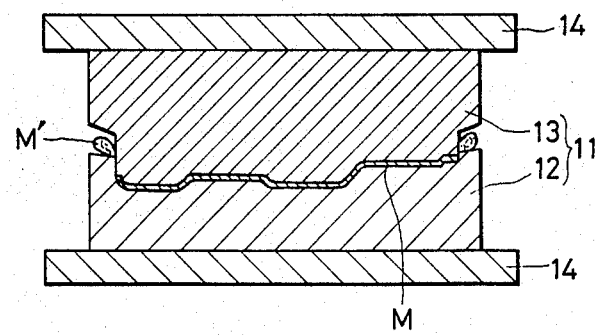
FIG. 18 is a cross-sectional view of the shaping mold of FIG. 17 wherein the mat is under compression.

The material mass B2, as formed by the above-mentioned steps, is molded under hot-compression to form a molded wooden product as explained hereunder. The compression-molding is carried out by the use of the shaping mold 85 shown in FIGS. 14 and 15. The holder 80, which holds the material mass B2 as shown in FIG. 13, is moved to the position above the lower mold 86 of the shaping mold 85 shown in FIG. 14. A switching valve (not shown), which controls the vacuum in duct 82, is deactivated to release the material mass B2 onto the lower mold 86. The mold 85 includes peripheral wall 88.

After mass B2 is positioned in the mold 85, the lower mold 86 and the upper mold 87, which have been heated by hot plates 89 controlled by a thermostat (not shown), align with one another by lowering the upper mold 87 toward the lower mold 86. Vacuum holes 87a and vacuum duct 90, provided in the upper mold 87, degas the material mass B2 during compression. Since the material mass B2 has been prepared such that the peripheral portion and the deep-drawn portion of the molded product have a higher density of raw material than the other portions of the mass B2, shaping mold 85 has a cavity corresponding to the peripheral portion and the deep-drawn portion of molded wooden product. Thus, the molded wooden product is formed having a thick peripheral portion M8 and a thick deep-drawn portion M7, while the overall density of the molded wooden product is substantially uniform.

A valve 91 for closing and opening the vacuum duct 90 during the vacuum operation is provided. By alternatly activating and deactivating the valve, a vacuum force is provided when the upper mold 87 is approximately 10 mm from the bottom dead point. The product M6 obtained from the mold after compression is lifted up along with the upper mold 87 by maintaining the vacuum force thereon. The molded wooden product M6 is released from the upper mold 87 by deactivating the switching valve 91. A conveyor means or the like (not shown), is inserted between the upper and the lower molds just prior to releasing the molded wooden product M6, and the product is transported to the next step by the conveyor means.

The molded wooden product M6 thus formed has a uniform density, thickened peripheral portion M8 and a thickened deep-drawn portion M7. The molded wooden product M6 has relatively light weight and it has improved strength characteristics.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A molded wooden product comprising wood fibers, said molded wooden product having portions therein of varying thickness at least one of said portions comprising a deep-drawn portion, and said molded wooden product having a substantially uniform density throughout.

2. A molded wooden product as set forth in claim 1, wherein said molded wooden product further comprises at least one of a binder composition, a water-repelling agent composition, and surface lubricant composition.

3. A molded wooden product as set forth in claim 2, wherein the binder composition comprises a synthetic resin.

4. A molded wooden product as set forth in claim 3, wherein the binder composition comprises at least one of a thermoplastic resin and a thermosetting resin.

5. A molded wooden product as set forth in claim 4, wherein said thermoplastic resin comprises chroman resin.

6. A molded wooden product as set forth in claim 4, wherein said thermosetting resin comprises at least one of a phenol resin and an urea.

7. A molded wooden product as set forth in claim 2, wherein the water-repelling agent composition comprises an aliphatic hydrocarbon composition.

8. A molded wooden product as set forth in claim 7, wherein said aliphatic hydrocarbon composition comprises a paraffin.

9. A molded wooden product as set forth in claim 1, wherein the deep-drawn portion comprises at least one protrusion extending outwardly from other of the portions of said molded wooden product adjacent said protrusion.

10. A molded wooden product as set forth in claim 1, wherein said molded wooden product comprises a door panel and the protrusion comprises an arm rest of said door panel.

11. A molded wooden product as set forth in claim 1, wherein at least one of the portions comprises a peripheral portion.

12. A molded wooden product as set forth in claim 11, wherein the peripheral portion has a thickness that exceeds the thickness of at least one of the other of the portions of said molded wooden product.

13. A molded wooden product as set forth in claim 12, wherein said molded wooden product comprises a door panel and the peripheral portion comprises a thickened border portion at the periphery of said door panel.

* * * * *